US008479145B2

(12) United States Patent
Swaminathan et al.

(10) Patent No.: US 8,479,145 B2
(45) Date of Patent: Jul. 2, 2013

(54) METHOD AND SYSTEM FOR DETERMINING A REUSE FACTOR

(75) Inventors: Sivakumar Swaminathan, Chennai (IN); K. Rajeswar Rao, Bangalore (IN)

(73) Assignee: Infosys Limited (IN)

( * ) Notice: Subject to any disclaimer, the term of this patent is extended or adjusted under 35 U.S.C. 154(b) by 980 days.

(21) Appl. No.: 12/547,889

(22) Filed: Aug. 26, 2009

(65) Prior Publication Data

US 2010/0058284 A1    Mar. 4, 2010

(30) Foreign Application Priority Data

Aug. 29, 2008    (IN) .......................... 2114/CHE/2008

(51) Int. Cl.
*G06F 9/44*    (2006.01)
(52) U.S. Cl.
USPC .......................................... 717/101; 717/100
(58) Field of Classification Search
USPC ........................................................ 717/101
See application file for complete search history.

(56) References Cited

U.S. PATENT DOCUMENTS

| 8,280,756 B1* | 10/2012 | Kanemoto et al. | 705/7.12 |
| 2003/0033586 A1* | 2/2003 | Lawler | 717/101 |
| 2003/0070157 A1* | 4/2003 | Adams et al. | 717/101 |
| 2003/0159131 A1* | 8/2003 | Litoiu et al. | 717/120 |
| 2004/0172612 A1* | 9/2004 | Kasravi et al. | 717/101 |
| 2005/0114828 A1* | 5/2005 | Dietrich et al. | 717/101 |
| 2005/0210442 A1* | 9/2005 | Seetharaman et al. | 717/101 |
| 2007/0168918 A1* | 7/2007 | Metherall et al. | 717/101 |
| 2008/0028362 A1* | 1/2008 | Ugai et al. | 717/101 |
| 2008/0046863 A1* | 2/2008 | Vitkin et al. | 717/105 |
| 2008/0127079 A1* | 5/2008 | Joss et al. | 717/120 |
| 2010/0058284 A1* | 3/2010 | Swaminathan et al. | 717/101 |

OTHER PUBLICATIONS

Devanbu et al. "Analytical and Empirical Evaluation of Software Reuse Metrics", 1996 IEEE, retrieved from <http://ieeexplore.ieee.org/stamp/stamp.jsp?tp=&arnumber=493415> total pp. 11.*
Pow-Sang et al. "An Approach of a Technique for Effort Estimation of Iterations in Software Projects" 2006 IEEE, retrieved from <http://ieeexplore.ieee.org/stamp/stamp.jsp?tp=&arnumber=4137439>, total pp. 8.*
Frakes et al. "Reuse Level Metrics", 1994 IEEE, retrieved from <http://ieeexplore.ieee.org/stamp/stamp.jsp?tp=&arnumber=365802> total pp. 10.*

(Continued)

*Primary Examiner* — Don Wong
*Assistant Examiner* — Marina Lee
(74) *Attorney, Agent, or Firm* — Lerner, David, Littenberg, Krumholz & Mentlik, LLP

(57) ABSTRACT

The present invention provides a method, system and computer program product for determining a reuse factor associated with a set of resources available for a project. The method includes identifying the set of resources from a repository. The predetermined saved-effort associated with the set of resources is also determined from the repository. The method further includes identifying one or more resources from the set of resources. The one or more resources are identified by a project leader to be used in the project. Thereafter, the reuse factor is estimated on the basis of the predetermined saved-effort associated with the set of resources and the effort saved by the use of the one or more resources.

13 Claims, 3 Drawing Sheets

OTHER PUBLICATIONS

Frakes et al. "Software Reuse: Metrics and Models", ACM Computing Surveys, vol. 28, No. 2, Jun. 1996, retrieved from <http://delivery.acm.org/10.1145/240000/234531/p415-frakes.pdf?ip=151.207.242.4&acc=ACTIVE%20SERVICE&CFID=142629094&CFTOKEN=82938661&__acm__=1353125997__2eb7c1b0c17f84009deb3e01751333b> total pp. 21.*

Aggarwal et al. "Software Reuse Metrics for Object-Oriented Systems", 2005 IEEE, retrieved from <http://ieeexplore.ieee.org/stamp/stamp.jsp?tp=&arnumber=1563143> total pp. 7.*

Mascena, "A Comparative Study on Software Reuse Metrics and Economic Models from a Traceability Perspective", 2005 IEEE, retrieved from <http://ieeexplore.ieee.org/stamp/stamp.jsp?tp=&arnumber=1506452> toal pp. 6.*

Banker et al. "Monitoring the Software Asset: Repository Evaluation of Software Reuse", Oct. 1991, retrieved from <citeseerx.ist.psu.edu/viewdoc/download?doi=10.1.1.86> total pp. 34.*

Richard D. Stutzke, "ftware Estimating Technology: A Survey", May 1996, retrieved from <http://moosehead.cis.umassd.edu/cis365/reading/SoftwareEstimatingSurvey.pdf> total pp. 12.*

Spoelstra et al., "Software Reuse in Agile Development Organizations—A Conceptual Management Tool", 2011 ACM, total pp. 8.*

* cited by examiner

METHOD AND SYSTEM FOR DETERMINING A REUSE FACTOR

BACKGROUND OF THE INVENTION

The present invention relates to the field of reuse of resources. More specifically, the present invention relates to a method and system for determining a reuse factor associated with a set of resources available for a project.

Currently, in the software industry, a number of existing resources are used to build new software. Examples of these resources include program codes, tools, methodologies, tables, and so forth. The resources available to the software industry may be used in the various stages of different projects. The use of existing resources helps in minimizing the costs incurred in the development of software, which, in turn, also reduces the cost transferred to the consumers of the software. The use of existing resources also helps in minimizing the amount of effort required to develop software.

There are a few existing techniques that help in quantifying the amount of effort saved by the use of existing resources. Typically, these techniques quantify the effort saved by the reuse of resources on the basis of the total number of hours that are saved by the reuse of these resources in a particular project. Some of these techniques quantify the effort saved by the reuse of resources on the basis of the amount of effort saved by using the corresponding resources.

Quantifying the amount of effort saved by the use of existing resources helps in defining strategies for the reuse of resources. Various industries benefit by using strategies to minimize the time, cost and effort required to complete a project. This further helps in reducing the time to market.

However, the techniques stated above have a number of limitations. Although some of these techniques provide a measure related to the reuse of resources, they do not provide information related to efficiency in the reuse of resources. For example, these techniques do not provide information related to the resources available to a team for executing a project, and the number of resources that are not being used effectively. Further, the reuse is an absolute number in terms of effort which is typically measured on the basis of the size of the project. However, this may not provide an accurate estimate of the efficiency in the reuse of resources. For example, the effort saved by the reuse of resources in a big project may be greater than that in a small project, but it does not represent the efficiency in the reuse of resources. Moreover, these techniques do not make use of the relevance of a resource in a project. This also results in inaccuracy in the estimation of the efficiency in the reuse of resources.

In light of the forgoing, there is a need for a method for efficiently estimating the reuse of resources. Further, the method should estimate the efficiency in the reuse of resources on the basis of the relevance of resources in various stages of a project.

BRIEF SUMMARY OF THE INVENTION

An object of the invention is to efficiently estimate the resources that can be reused in different projects.

Another object of the invention is to estimate the reuse of resources on the basis of the relevance of the resources in a project.

To achieve the objectives mentioned above, the invention provides a method, system and computer program product for determining a reuse factor associated with a set of resources available for a project. The method includes identifying a set of resources from a repository on the basis of the type of the project. Predetermined saved-effort associated with the set of resources is also identified from the repository. The method also includes identifying one or more resources from the set of resources that can be used at least once in the project. After identifying the set of resources and the one or more resources, the reuse factor is estimated. The estimation of the reuse factor is based on the predetermined saved-effort corresponding to the set of resources and the effort saved by the use of the one or more resources in the project. The effort saved by the use of the one or more resources is determined on basis of the predetermined saved-effort corresponding to the one or more resources and the number of times the one or more resources are used across the various stages of the project.

The method stated above provides an estimate of the reuse of resources. The method estimates the reuse factor on the basis of the relevance of the resources used in the project. Therefore, the method provides an efficient estimate of the reuse of resources. This estimate acts like a guiding factor for the project leaders in making better use of the existing resources, and thereby increasing the efficiency of the projects.

BRIEF DESCRIPTION OF THE DRAWINGS

Various embodiments of the invention will hereinafter be described in conjunction with the appended drawings, provided to illustrate and not to limit the invention, wherein like designations denote like elements, and in which.

DETAILED DESCRIPTION

The invention describes a method, system and computer program product for determining a reuse factor associated with a set of resources that are used in the execution of a project. The reuse factor provides a quantitative estimate related to the use of existing resources in the project. The set of resources are identified from a repository. In various embodiments of the invention, the repository is used to store and maintain data for future use. The data in the repository can be code documents, design documents, compressed files, and so forth. The plurality of resources and predetermined saved-effort associated with the plurality of resources is stored and maintained as data in the repository. The predetermined saved-effort for a resource represents the amount of effort that may be saved by the use of the resource in a project. The predetermined saved-effort may be represented in terms of the time saved, effort saved, cost saved, and so forth.

In various embodiments of the invention, the repository is updated on the basis of the updates in at least one of the plurality of resources. For example, if a resource becomes obsolete after a period of time or it has not been used for a particular period of time, then it can be removed from the repository. The repository is also updated when there is an update in the saved effort associated with one or more of the plurality of resources. For example, if the saved effort of a resource is different from the predetermined saved-effort of the resource, as saved in the repository, then the predetermined saved-effort may be updated in the repository. The repository is also updated on the basis of the updates related to new resources. For example, if a resource has been developed and it is found that various parts of the resource can be used in various types of projects, then the new resource may be added to the repository with the relevant details.

Figure 1:
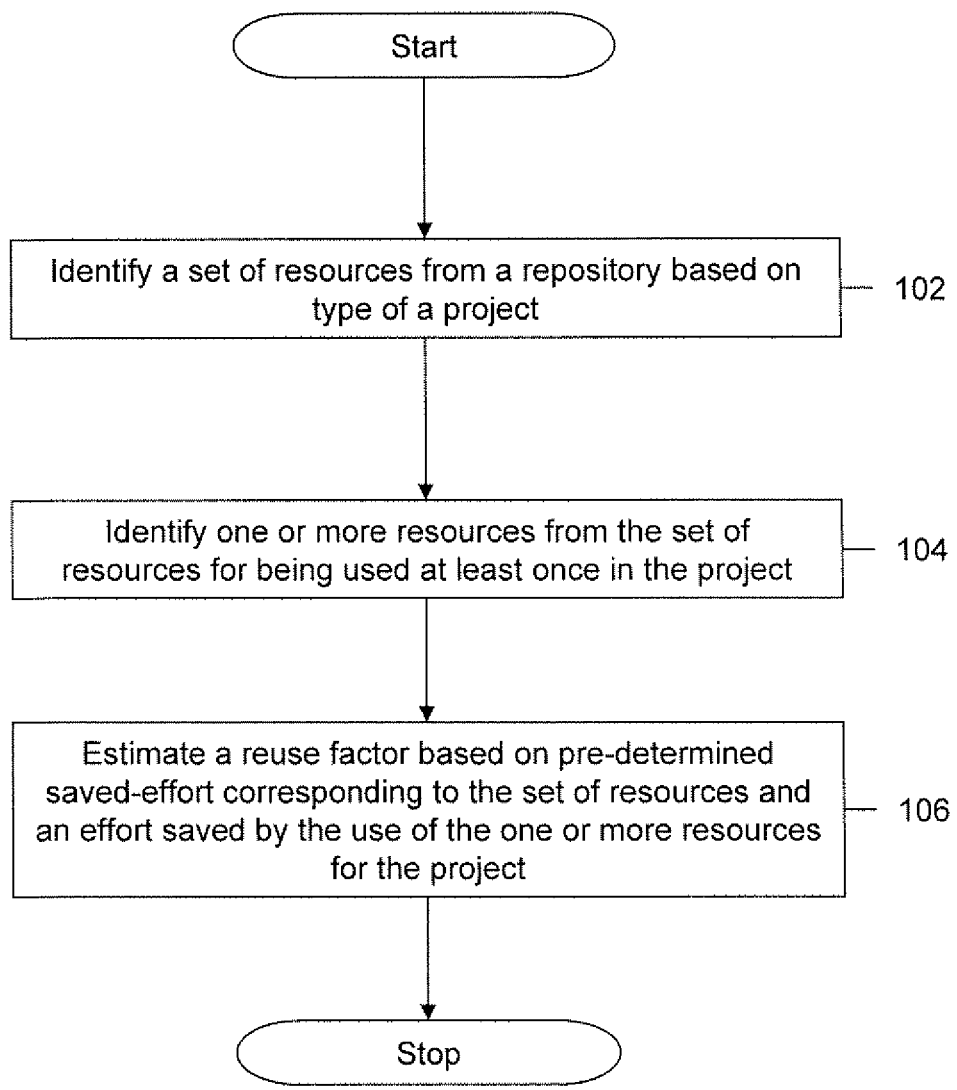
FIG. 1 illustrates a flowchart of a method for determining a reuse factor, in accordance with an embodiment of the invention.

FIG. 1 illustrates a flowchart of a method for determining a reuse factor, in accordance with an embodiment of the invention.

At 102, a set of resources is identified from the repository that can be used in a particular project. The set of resources is identified on the basis of the type of the project. Examples of the types of projects include, but are not limited to, projects related to marketing, operations, trading, and software. The predetermined saved-effort associated with the set of resources is also identified from the repository. The identification of the set of resources is described in detail in conjunction with the description of FIG. 2.

At 104, one or more resources are identified from the set of resources. These resources are identified by a project leader to be used at least once in the project. Typically, the project leader is a member of the project team who leads the project. However, the project leader of a project may also be selected from other teams on the basis of his or her experience and expertise. The identification of the one or more resources is described in detail in conjunction with the description of FIG. 2.

At 106, the reuse factor is estimated on the basis of the effort saved by the use of the identified one or more resources in the project. The effort saved by the use of the one or more resources is estimated on the basis of the predetermined saved-effort associated with the one or more resources. The estimation of the reuse factor is also based on the predetermined saved-effort of the set of resources. The estimation of the reuse factor is further described in detail in conjunction with the description of FIG. 2.

Although various embodiments of the invention have been described for projects related to software, it should be apparent to a person skilled in the art that the application of the method need not be limited to software projects. For example, the method may be applied to projects related to marketing, operations, trading, and so forth.

Figure 2:
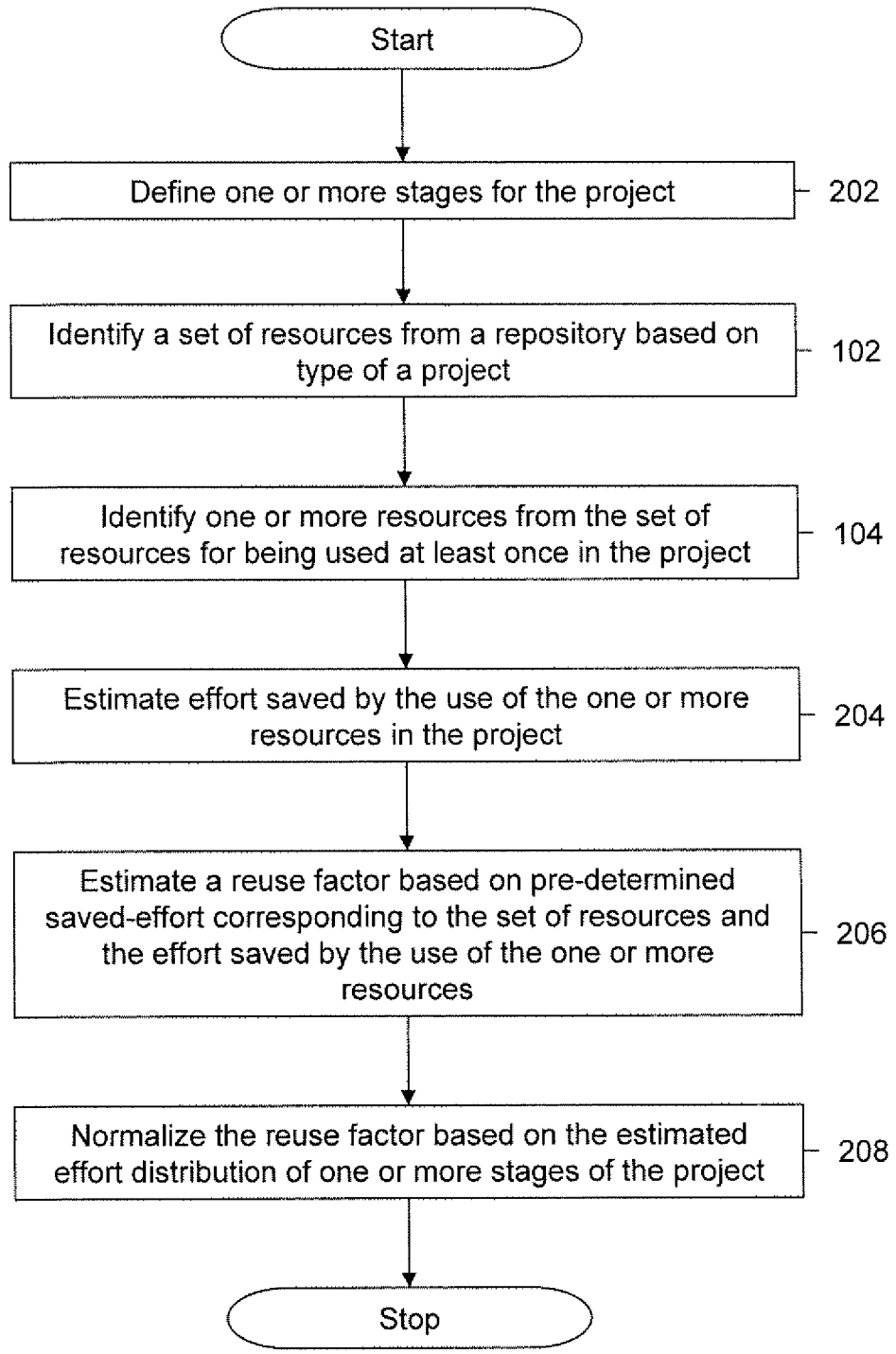
FIG. 2 illustrates a flowchart of a method for determining the reuse factor, in accordance with another embodiment of the invention.

FIG. 2 illustrates a flowchart of a method for determining the reuse factor, in accordance with another embodiment of the invention.

At 202, one or more stages of the project are defined. At each stage of the project, a portion of the project is completed. For example, the stages of a project may be project analysis, project design, project building, project testing, and project management, and so forth, which are decided on the basis of the activities performed at each stage. In an embodiment of the invention, the stages of the project may be defined for the entire life cycle of a project. In another embodiment of the invention, only a portion of the life cycle of the project may be considered for execution, and the reuse factor may be determined only for that portion of the project. In this case, the stages are defined only for the considered portion of the project, hereinafter referred to as the project. In various embodiments of the invention, the project is considered to be complete after the activities of each of the defined stages are executed. In an embodiment of the invention, the one or more stages of the project are defined by a user. Typically, the user is a member of the project team. However, the user may also be selected from other teams on the basis of his or her experience and expertise.

At 102, the set of resources required to execute the one or more stages of the project is identified from the repository. The set of resources is identified on the basis of the type of the project. The predetermined saved-effort associated with the set of resources is also identified from the repository. The predetermined saved-effort associated with the set of resources is used to determine the effort saved by the use of the set of resources in the various stages of the project. The effort saved by the use of the set of resources is used to estimate the reuse factor.

In an embodiment of the invention, the effort saved by the use of the set of resources in a stage of the project is determined on the basis of the following equation:

$$TXs = \sum_{a=1}^{m} Xa \quad (1)$$

where, TXs represents the total effort saved by each resource of the set of resources in a stage 's' of the project, Xa represents the predetermined saved-effort of the $a^{th}$ resource, and m represents the total number of resources in the set of resources. Similarly, the effort saved by the use of the set of resources can be determined for all the stages of the project. For the calculation of TXs, the effort saved corresponding to the single use of each resource is considered.

In an embodiment of the invention, the set of resources is identified by a user. Typically, the user is a member of the project team. However, the user may also be selected from other teams on the basis of his or her experience and expertise. In another embodiment of the invention, the set of resources is identified by using a software application, based on the type of the project. It will be apparent to any person skilled in the art that various software applications may be designed, which can identify the resources from a repository on the basis of the requirements corresponding to the type of the project.

At 104, one or more resources are identified from the set of resources. These resources are identified by a project leader to be used at least once in the one or more stages of the project. Typically, the project leader is a member of the project team who leads the project. However, the project leader of a project may also be selected from other teams on the basis of his or her experience and expertise. In an embodiment of the invention, the project leader may be assisted by one or more team members in identifying the one or more resources. Moreover, the selection of the one or more resources to be used in the project may be validated by a team of experts. For example, the team of experts may include members of the organization with advanced skills in software development. In an embodiment of the invention, the one or more resources are identified on the basis of their estimated impact on the execution of the project. The impact may be in the form of, but not limited to, minimization of cost, effort, or time.

At 204, the effort saved by the use of the one or more resources is estimated, to estimate the reuse factor. The effort saved is estimated on the basis of the predetermined saved-effort of the one or more resources. The estimation of the effort saved by the use of the one or more resources is also based on the number of times each of the one or more resources is used in the one or more stages of the project.

In an embodiment of the invention, the effort saved by the use of the one or more resources in a stage of the project that can be used one or more times in the stage is determined on the basis of the following equation:

$$TEs = \sum_{i=1}^{n} Xi \times Yi \quad (2)$$

where, TEs represents the total effort saved by the use of the one or more resources in stage 's' of the project, n represents the total number of resources selected from the set of resources, Xi represents the predetermined saved-effort of the $i^{th}$ resource, and Yi represents the number of times $i^{th}$ resource is used in stage 's'. For example, if in the stage 'build' the predetermined saved-effort of four resources $X_1$, $X_2$, $X_3$ and $X_4$ is 30, 25, 0.25 and 0.1, respectively, and they are used 1, 1, 77 and 15 times in the particular stage, then TEbuild is 75.75, in accordance with equation (2). Further, if in the stage 'manage' the predetermined saved-effort of two resources $X_5$ and $X_6$ is 10 and 100, respectively, and they are used 15 and 16 times in the particular stage of the project, then TEmanage is calculated to be 1750, in accordance with equation (2).

Similarly, the effort saved by the use of the one or more resources can be determined for all the stages of the project.

At 206, the total effort saved by the single use of each resource in the set of resources and the total effort saved by the use of each of the one or more resources one or more times is used to estimate the reuse factor.

In an embodiment of the invention, the reuse factor is estimated according to the following equation:

$$RF = \sum_{s=1}^{t} TEs \div TXs \qquad (3)$$

where, RF represents the reuse factor, t represents the total number of stages of the project, TEs represents the effort saved by the use of one or more resources in the $s^{th}$ stage, as determined at 102, and TXs represents the effort saved by the use of the set of resources in the $s^{th}$ stage, as determined at 204. Therefore, RF provides an estimate related to the efficiently of the use of the resources available for the project. For example, if the project includes two stages namely, building and managing the software, and TEbuild, TEmanage, TXbuild and TXmanage are 75.75, 1750, and 2593, 809, respectively, then RF for the stage build is 0.02921, and RF for the stage manage is 2.1632, and the total RF is 2.1924, in accordance with equation (3).

In various embodiments of the invention, the reuse factor may be normalized, according to the relative relevance of the stages of the project.

At 208, the reuse factor is normalized on the basis of an estimated effort distribution for each of the one or more stages. The estimated effort distribution for each stage represents a ratio of the effort required for the stage to the total effort required for the project. For example, if the stages in the project are analysis, design, build, testing, project management, training and other activities, and the effort required to execute each stage is 10, 15, 40, 17, 10, 3, and 5, respectively, then the estimated effort distribution is 0.10, 0.15, 0.40, 0.17, 0.10, 0.03, and 0.05 for the corresponding stages.

In an embodiment of the invention, the normalized reuse factor is estimated on the basis of the following equation:

$$RFn = \sum_{s=1}^{t} (TEs \div TXs) \times CSs \qquad (4)$$

where, RFn represents the normalized reuse factor, t represents the total number of stages of the project, TEs represents the effort saved by the use of one or more resources in the $s^{th}$ stage of the project, as determined at 204, TXs represents the effort saved by the use of the set of resources in the $s^{th}$ stage of the project, as determined at 102, and CSs represents the estimated effort distribution for the stage 's'. For example, if the project includes two stages namely, building and managing the software, and TEbuild, TEmanage, TXbuild, TXmanage, CSbuild and CSmanage is 75.75, 1750, 2593, 809, 0.91 and 0.09 respectively, then RFbuild is 0.0265 and RFmanage is 0.1947. Therefore, RFn of the project is 0.2212, in accordance with equation (4).

Figure 3:
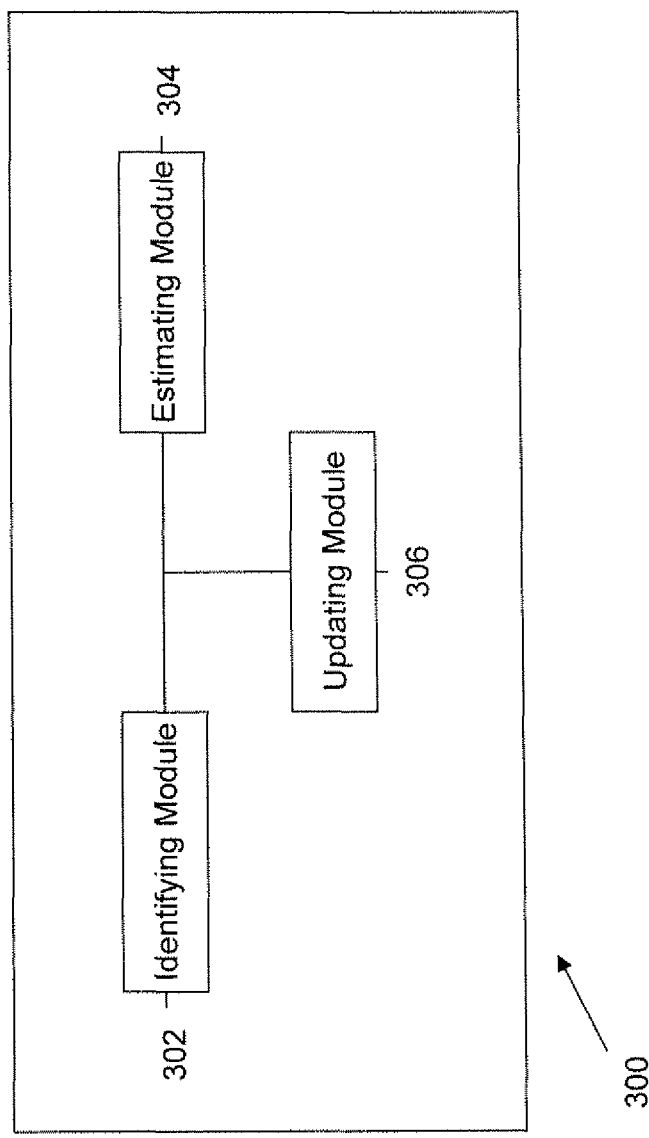
FIG. 3 illustrates a block diagram of a system for determining the reuse factor, in accordance with an embodiment of the invention.

FIG. 3 illustrates a block diagram of a system 300 for determining a reuse factor, in accordance with an embodiment of the invention. To describe the system reference will be made to FIG. 2, although it should be understood that the system can be implemented with any other suitable embodiment of the invention. System 300 includes an identifying module 302, an estimating module 304 and an updating module 306.

Identifying module 302 identifies a set of resources and the predetermined saved-effort associated with the set of resources from the repository. Estimating module 304 estimates the reuse factor on the basis of the identified predetermined saved-effort associated with the set of resources and the effort saved by the use of the one or more resources. Updating module 306 updates the repository on the basis of the updates in at least one of the plurality of resources, updates in the saved-effort of at least one of the plurality of resources and new resources.

Identifying module 302 identifies the set of resources and the predetermined saved-effort associated with the set of resources from the repository for the execution of a particular project with one or more defined stages. At each stage of the project, a portion of the project is completed. For example, the stages of a project may be project analysis, project design, project building, project testing, and project management, and so forth, which are determined on the basis of the activities performed at each step. Identifying module 302 identifies the set of resources and their predetermined saved-effort on the basis of the type of the project. The identification of the set of resources is further described in detail in conjunction with the description FIG. 1 and FIG. 2.

Identifying module 302 is also used by a project leader to identify one or more resources from the set of resources to be used in one or more stages of the project. Typically, the project leader is a member of the project team who leads the project. However, the project leader of a project may also be selected from other teams on the basis of his or her experience and expertise. The identification of the one or more resources has been described in detail in conjunction with the description of FIG. 1 and FIG. 2.

Estimating module 304 estimates the reuse factor on the basis of the identified predetermined saved-effort associated with the set of resources and the effort saved by the use of the one or more resources. The effort saved by the use of the one or more resources is estimated on the basis of the predetermined saved-effort associated with the one or more resources and the number of times each of the one or more resources are used in one or more stages defined for the project. The estimation of the reuse factor has been described in detail in conjunction with the description of FIG. 2.

Estimating module 304 also normalizes the reuse factor on the basis of an estimated effort distribution of each stage of the project. Estimating module 304 normalizes the reuse factor, based on equation (4). The normalization of the reuse factor has been described in detail in conjunction with the description of FIG. 2.

Updating module 306 updates the repository on the basis of the updates in at least one of the plurality of resources. For example, if a resource becomes obsolete after a period of time or it has not been used for a particular period of time, then it can be removed from the repository. Updating module 306 also updates the repository when there is an update in the saved-effort associated with the plurality of resources. For example, if the saved effort of a resource is different from the predetermined saved-effort of the resource in the repository, then the predetermined saved-effort may be updated in the repository. Updating module 306 also updates the repository on the basis of the updates related to new resources. For example, if a new resource has been developed and it is found that the various portions of the resource can be used across various types of projects, then the new resource may be added in the repository with the relevant details.

The method and system stated above provide a quantitative estimate of the reuse of resources. The method includes estimating the reuse factor on the basis of the number of times one or more resources are used in the project. The method also compares the effort saved by using the one or more resources with the effort that would be saved if all the identified resources are used. Therefore, the method provides a standardized and an efficient measure related to the efficiency of the reuse of resources. Further, the method determines the reuse factor on the basis of the relevance of the resources in the various stages of the project. This helps in improving accuracy in determining the efficiency in the reuse of resources. The reuse factor is a quantitative estimate related to the efficiency in the reuse of resources. Therefore, the reuse factor may be used to compare the efficiency in the reuse of resources across different types of projects.

The system for determining a reuse factor associated with a set of resources available for a project, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer comprises a microprocessor, which is connected to a communication bus. The computer also includes a memory, which may include Random Access Memory (RAM) and Read Only Memory (ROM). The computer system also comprises a storage device, which can be a hard disk drive or a removable storage drive such as a floppy disk drive, an optical disk drive, etc. The storage device can also be other similar means for loading computer programs or other instructions into the computer system. The computer system also includes a communication unit, which enables the computer to connect to other databases and the Internet through an Input/Output (I/O) interface. The communication unit also enables the transfer as well as reception of data from other databases. The communication unit may include a modem, an Ethernet card, or any similar device which enable the computer system to connect to databases and networks such as Local Area Network (LAN), Metropolitan Area Network (MAN), Wide Area Network (WAN) and the Internet. The computer system facilitates inputs from a user through an input device, accessible to the system through an I/O interface.

The computer system executes a set of instructions that are stored in one or more storage elements, in order to process the input data. The storage elements may also hold data or other information as desired. The storage element may be in the form of an information source or a physical memory element present in the processing machine.

The present invention may also be embodied in a computer program product for determining a reuse factor associated with a set of resources available for a project. The computer program product includes a computer usable medium having a set program instructions comprising a program code for determining a reuse factor associated with a set of resources available for a project. The set of instructions may include various commands that instruct the processing machine to perform specific tasks such as the steps that constitute the method of the present invention. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention, as described in the claims.

The invention claimed is:

1. A method for determining a reuse factor for efficiently determining reusability associated with a set of resources for a project, the method comprising:
   a. identifying the set of resources for the project from a repository based on type of the project, the repository comprising a plurality of resources associated with a plurality of types of projects, the repository further comprising predetermined saved-effort associated with the reuse of each of the plurality of resources;
   b. estimating total effort saved by using each of the identified set of resources in one or more stages of the project, wherein the estimation is performed based on the predetermined saved-effort associated with the reuse of each of the identified set of resources and total number of resources in the identified set of resources;
   c. selecting one or more resources from the identified set of resources for the project, wherein the one or more resources are selected by analyzing impact of the identified set of resources on execution of the project;
   d. estimating total effort saved by using each of the selected one or more resources in the one or more stages of the project, wherein the estimation is performed based on the predetermined saved-effort associated with the reuse of each of the selected one or more resources and number of times each of the selected one or more resources are used in the one or more stages of the project; and
   e. estimating the reuse factor based on the estimated total effort saved by the use of the identified set of resources and the estimated total effort saved by the use of the selected one or more resources.

2. The method of claim 1 further comprising normalizing the reuse factor, wherein the reuse factor is normalized based on an estimated effort distribution for each of the one or more stages.

3. The method of claim 2, wherein the estimated effort distribution for each stage represents a ratio of effort required for the stage to the effort required for the project.

4. The method of claim 1 further comprising updating the repository, wherein the repository is updated based on updates in at least one of the plurality of resources, updates in saved-effort associated with the plurality of resources and new resources.

5. The method of claim 1, wherein the set of resources are identified by a user.

6. A system for determining a reuse factor for efficiently determining reusability associated with a set of resources for a project, the system comprising:
   a. a memory comprising program instructions;
   b. a processor configured for executing the program instructions stored in the memory;
   c. an identifying module in communication with the processor and configured for:
      i. identifying the set of resources for the project from a repository based on type of the project, the repository comprising a plurality of resources associated with a plurality of types of projects, the repository further comprising predetermined saved-effort associated with the reuse of each of the plurality of resources; and
      ii. selecting one or more resources from the identified set of resources for the project, wherein the one or more resources are selected by analyzing impact of the identified set of resources on execution of the project; and
   d. an estimating module in communication with the processor and configured for:
      i. estimating total effort saved by using each of the identified set of resources in one or more stages of the project, wherein the estimation is performed based on the predetermined saved-effort associated with the reuse of each of the identified set of resources and total number of resources in the identified set of resources;
      ii. estimating total effort saved by using each of the selected one or more resources in the one or more stages of the project, wherein the estimation is performed based on the predetermined saved-effort associated with the reuse of each of the selected one or more resources and number of times each of the selected one or more resources are used in the one or more stages of the project; and
      iii. estimating the reuse factor based on the estimated total effort saved by the use of the identified set of resources and the estimated total effort saved by the use of the selected one or more resources.

7. The system of claim 6, wherein the estimating module is further configured for normalizing the reuse factor based on an estimated effort distribution for each of the one or more stages.

8. The system of claim 7, wherein the estimated effort distribution for each stage represents a ratio of effort required for the stage to the effort required for the project.

9. The system of claim 6 further comprising an updating module in communication with the processor and configured for updating the repository, wherein the repository is updated based on updates in at least one of the plurality of resources, updates in saved-effort associated with the plurality of resources and new resources.

10. A computer program product for use with a computer, the computer program product comprising a non-transitory computer usable medium having a computer readable program code embodied therein for determining a reuse factor for efficiently determining reusability associated with a set of resources for a project, the computer readable program code performing:
   a. identifying the set of resources for the project from a repository based on types of the project, the repository comprising a plurality of resources associated with a plurality of types of projects, the repository further comprising predetermined saved-effort associated with the reuse of each of the plurality of resources;
   b. estimating total effort saved by using each of the identified set of resources in one or more stages of the project, wherein the estimation is performed based on the predetermined saved-effort associated with the reuse of each of the identified set of resources and total number of resources in the identified set of resources;
   c. selecting one or more resources from the identified set of resources for the project, wherein the one or more resources are selected by analyzing impact of the identified set of resources on execution of the project;
   d. estimating total effort saved by use of each of the selected one or more resources in the one or more stages of the project, wherein the estimation is performed based on the predetermined saved-effort associated with the reuse of each of the selected one or more resources and number of times each of the selected one or more resources are used in the one or more stages of the project; and
   e. estimating the reuse factor based on the estimated total effort saved by the use of the identified set of resources and the estimated total effort saved by the use of the selected one or more resources.

11. The computer program product of claim claim 10, wherein the computer readable program code further performing normalizing the reuse factor, the reuse factor being normalized based on an estimated effort distribution required for the one or more stages.

12. The computer program product of claim 11, wherein the estimated effort distribution for each stage represents a ratio of effort required for the stage to the effort required for the project.

13. The computer program product of claim 10, wherein the computer readable program code further performs updating the repository, wherein the repository is updated based on updates in at least one of the plurality of resources, updates in saved-effort associated with the plurality of resources and new resources.

* * * * *